(12) United States Patent
Wang et al.

(10) Patent No.: US 7,519,581 B2
(45) Date of Patent: Apr. 14, 2009

(54) METHOD AND APPARATUS FOR PERFORMING A SEARCH

(75) Inventors: Xuejun Wang, San Jose, CA (US); Brian Acton, Saratoga, CA (US); Manish R. Baldua, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 120 days.

(21) Appl. No.: 11/119,637

(22) Filed: May 2, 2005

(65) Prior Publication Data

US 2005/0246332 A1    Nov. 3, 2005

Related U.S. Application Data

(60) Provisional application No. 60/567,316, filed on Apr. 30, 2004.

(51) Int. Cl.
*G06F 7/00* (2006.01)
*G06F 17/30* (2006.01)

(52) U.S. Cl. .............................. 707/3; 707/10; 709/203

(58) Field of Classification Search .................. 707/2, 707/3, 10, 100; 709/203, 218
See application file for complete search history.

(56) References Cited

U.S. PATENT DOCUMENTS

| | | | | |
|---|---|---|---|---|
| 5,640,553 | A * | 6/1997 | Schultz ........................... | 707/5 |
| 6,366,910 | B1 * | 4/2002 | Rajaraman et al. ............. | 707/5 |
| 6,539,377 | B1 * | 3/2003 | Culliss ........................... | 707/5 |
| 6,963,867 | B2 * | 11/2005 | Ford et al. ...................... | 707/3 |
| 2002/0099694 | A1 * | 7/2002 | Diamond et al. ............... | 707/3 |
| 2005/0071255 | A1 |  3/2005 | Wang et al. | |

* cited by examiner

*Primary Examiner*—Hosain T Alam
*Assistant Examiner*—Van H Ngo
(74) *Attorney, Agent, or Firm*—Morrison & Foerster LLP

(57) ABSTRACT

A method and apparatus for generating search results with higher relevancy. More specifically, the present invention provides a determination whether a search term belongs to a particular category. Namely, properly associating a search term with the correct category will greatly enhance the generation of search results with higher relevancy.

21 Claims, 6 Drawing Sheets

METHOD AND APPARATUS FOR PERFORMING A SEARCH

This application claims the benefit of U.S. Provisional Application No. 60/567,316 filed on Apr. 30, 2004, which is herein incorporated by reference.

The present invention relates to a method and apparatus for assisting a user in performing a search. More specifically, the present invention relates to a novel approach that assists a user in narrowing or focusing a search by determining whether a search term belongs to a category.

BACKGROUND OF THE INVENTION

With the proliferation of vast amount of information on the Internet, it is often very difficult to search and locate relevant information without having to first expend a great deal of time to peruse over many irrelevant search results. Depending on the material that is being sought, the user is often frustrated by having to view many immaterial search results.

One difficulty in searching for relevant information on the Web is that the user is often not using the most relevant search term(s). For example, a user may enter very general terms such as "Sony" or "shoes" and the like. Such general terms often produce a very large number of search results. The results are not particularly focused and often require a substantial amount of filtering by the user, where the user may have to enter additional narrowing terms. Unfortunately, the reason that the user may have started the search with a very general term could very well be that the user is not sure of a more specific search term to better define the search. For example, the user may be looking for the latest and most popular video game, but is not sure of the specific title or the manufacturer of the video game. As a result, the user is often required to view many immaterial search results before reaching the proper document or to further deduce a better or more focused search term.

Therefore, there is a need in the art for a method and apparatus that provides search results with higher relevancy.

SUMMARY OF THE INVENTION

In one embodiment, the present invention provides a method and apparatus for generating search results with higher relevancy. More specifically, the present invention provides a determination whether a search term belongs to a particular category, e.g., a product category. For example, a search term "apple" may belong to drastically different categories, e.g., to a category labeled "fruits" or to a category labeled "electronics". Thus, properly associating a search term with the correct category will greatly enhance the generation of search results with higher relevancy.

In one embodiment, the ability to ascertain the proper category for a search term is generated in accordance with sales and/or click information, e.g., via scoring of search terms that is premised on sales and/or click information. Thus, the present invention provides a significant benefit in that the destination page or search result associated with each search term will likely be relevant to the user's search. For example, in the context of shopping the search result will likely present products that are known to be popular and have recently been sold or clicked.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
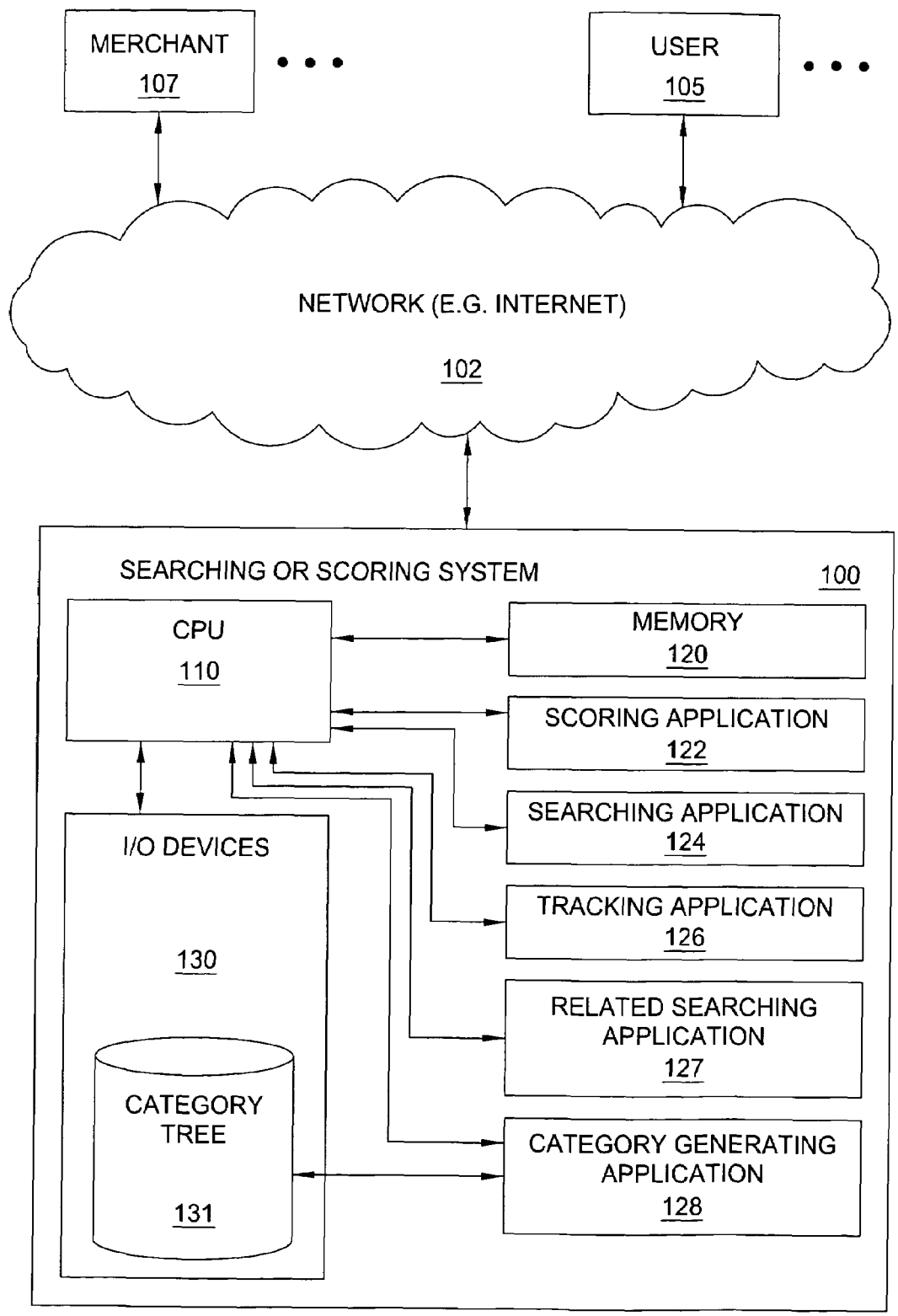
FIG. 1 is a block diagram illustrating a scoring system of the present invention.

FIG. 1 is a block diagram illustrating a scoring system 100 of the present invention. The scoring system 100 is tasked with scoring a document, e.g., a product, a service, a website or an article, within a search result set generated in accordance with a search term. For brevity, it should be noted that although the present invention is described below within the context of searching for a product, the present invention is not so limited. In other words, the present invention is applicable in assisting a user to refine a search for a document in general.

More specifically, FIG. 1 illustrates a searching or scoring system 100 that is interacting with a network, e.g., the Internet 102, where a plurality of users 105 is allowed to conduct searches. The search is typically triggered by the users who will input one or more search terms, e.g., "laptop computer", "DVD", "gas grill" and so on. The search may include a search for products and services desired by the users. The products and services may be offered by an entity maintaining the searching or scoring system 100, e.g., a company that is operating a website that offers a large volume of products and services, e.g., Walmart and the like. Alternatively, the products and services may be offered by a plurality of merchants 107, where the searching or scoring system 100 is deployed by a third party and is only tasked with generating the search results associated with the search term provided by the users, e.g., a search engine application. In sum, the system 100 of the present invention is not limited in the manner that it is deployed.

In one embodiment, the system 100 is implemented using a general purpose computer or any other hardware equivalents. More specifically, the scoring system 100 comprises a processor (CPU) 110, a memory 120, e.g., random access memory (RAM) and/or read only memory (ROM), a scoring engine or application 122, a searching engine or application 124, a tracking engine or application 126, a related searching engine or application 127, a category generating engine or application 128, and various input/output devices 130 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the scoring engine or application 122, the searching engine or application 124, the tracking engine or application 126, the related searching engine or application 127, and the category generating engine or application 128 can be implemented as physical devices or systems that are coupled to the CPU 110 through a communication channel. Alternatively, the scoring engine or application 122, the searching engine or application 124, the tracking engine or application 126, and the related searching engine or application 127 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 120 of the computer. As such, the scoring engine or application 122, the searching engine or application 124, the tracking engine or application 126, the related searching engine or application 127, and the category generating engine or application 128 (including associated data structures) of the present invention can be stored on a computer readable medium, e.g., RAM memory, magnetic or optical drive or diskette and the like.

In one embodiment, the searching or scoring system is designed to address the criticality of improving search relevancy. For example, the present invention exploits the fact that users disclose their preference pertaining to favorite products for popular search terms through purchasing or clicking on products that they like. When users search a term in a shopping/product search site, the site will often return numerous irrelevant results, even in the top result positions. Often, users will simply filter out the wrong results, and only select the results that they are interested in, i.e., relevant results. The relevancy of the search results is significantly substantiated when a user actually purchases a product selected from the search results. Namely, when a user decides to buy the product, then the product he or she chose must be highly relevant to the search term within the context of the price of the product and/or the merchant selling the product.

It has been determined that if the tracking data size is sufficiently large, users' choices on each given search term tend to converge to several products from several merchants, and all of the results are very relevant to the search term. By learning and applying users' choices, especially from purchasing and/or clicking, highly relevant products can be assigned with higher score/rank than over text relevant only products. This novel approach will produce highly relevant search results for a search term. In fact, additionally refinements or normalization can be applied, e.g., the ordering of merchants for each search term. These optional adjustments are further described below.

In one embodiment of the present invention, the score assigned to a product in response to a search term that is based on user purchase and/or click information is referred to as a "hotscore". This hotscore can be used by a search engine in producing search results in response to a search term. In one embodiment, the present hotscore is used in generating the search results or, alternatively, is employed to supplement a search engine that currently employs other parameters, such as including, paid inclusion, paid sponsorship, and text relevancy. An example of a method for generating and using scores assigned to a product or a product-merchant pair that are based on user purchase and/or click information is disclosed in U.S. patent application Ser. No. 10/675,234, filed on Sep. 30, 2003 and is herein incorporated by reference in its entirety.

Figure 2:
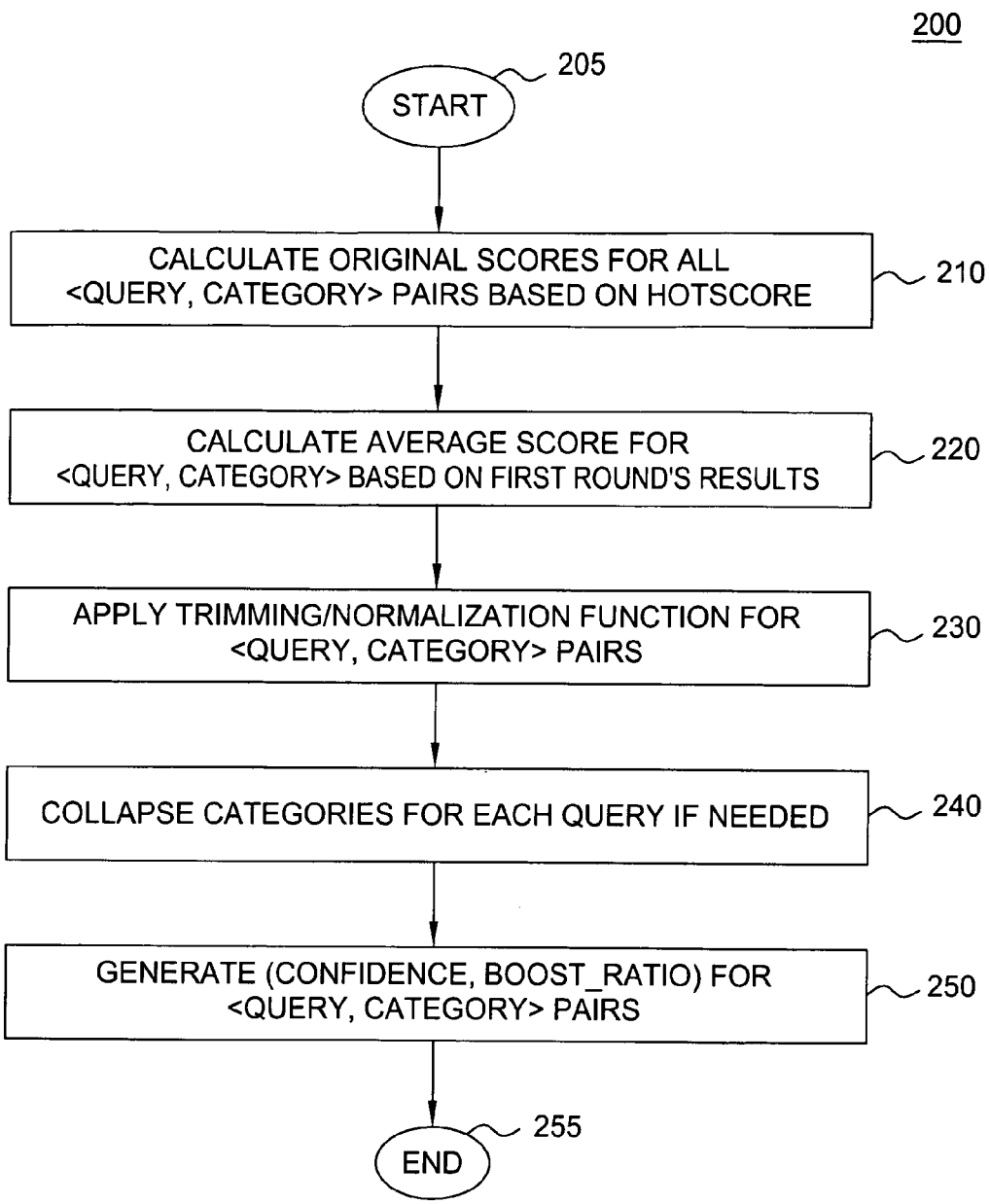
FIG. 2 illustrates a flowchart of a method for generating a confidence level for a "query-category" pair.

FIG. 2 illustrates a flowchart of a method 200 for generating a confidence level for a "query-category" pair. In other words, a confidence level is determined whether a search term or query is associated with a particular category, e.g., a product category. Method starts in step 205 and proceeds to step 210.

In step 210, method 200 calculates a relevancy score for each "query-category" pair. Initially, method 200 consults a category tree 131 as shown in FIG. 1. The category tree 131 can be generated by a third party or it can be dynamically generated or updated from results generated by the tracking application 126 of FIG. 1.

To illustrate, the category tree 131 may indicate that "apple" is within the category "pastry" which is within the category "baked goods" which is within the category "food" and so on. Alternatively, the category tree 131 may indicate that "apple" is also within the category "computer" which is within the category "electronics" and so on. Thus, a query-category pair may be <apple, pastry>, <apple, computer>, and so on.

In step 210, a score is generated for each query-category pair. The score is intended to reflect how relevant is the search term or query when compared with a category. For example, a score for the query-category pair <apple, pastry> reflects how relevant is the pairing of the search term "apple" with the category "pastry". In one embodiment, the score is generated based on "hotscore", which in turn, is based on sales and click information. In other words, the calculated score reflects what is the relevance to the category "pastry" when a user types the search term "apple". If users frequently purchase items or clicks on links that are categorized as pastry using the search term "apple", then the score for the query-category pair <apple, pastry> will be high. Whereas, if users infrequently purchase items or clicks on links that are categorized as pastry using the search term "apple", then the score for the query-category pair <apple, pastry> will be low.

In step 220, method 200 calculates an average score for each search term. For example, there may be multiple query-category pairs for a single search term "apple", e.g., <apple, pastry> with score 5000, <apple, computer> with score 6000, and <apple, electronics> with score 7000 and so on. Thus, scores associated with these query-category pairs are summed and then divided to yield an average score of 6000 for the search term "apple".

In step 230, method 200 applies a trimming and/or normalizing function on the query-category pairs. Namely, certain query-category pairs can be trimmed or normalized so that the calculated scores are adjusted. For example, if the query-category pair <apple, Christmas ornament> has a score of 20, then it may be practical to trim this query-category pair so that the average score generated in step 220 is not severely impacted by this query-category pair. Various trimming and normalization functions can be applied depending of application requirements.

In step 240, method 200 optionally collapses categories for each query, if needed. In certain instances, various categories are fairly similar such that they can be merged or collapsed. For example, the query-category pairs <apple, pie> and <apple, pastry> can be collapsed, if desired.

In step 250, method 200 generates a confidence level and a boost ratio (confidence, boost_ratio) for the query-category pairs. In one exemplary embodiment, the confidence level has a range of 0-100% and the boost_ratio has a range of 0-1000. The confidence level reflects the level of confidence that when a query is received that it should be associated with that particular category. The boost_ratio reflects a boost in the relevancy score that will be applied if it is determined that the search term or query belongs to a particular category. For example, if the <apple, computer> query-category pair has a score of 10,000, then the (confidence, boost_ratio) for this query-category pair can be (75%, 750). Since the score is based on sales and click information, it means that there is a 75% confidence that when the system receives a search term "apple", that the user is interested in the category of computer. In turn, a boost in the amount of 750 can be applied. Method then ends in step 255.

Figure 3:
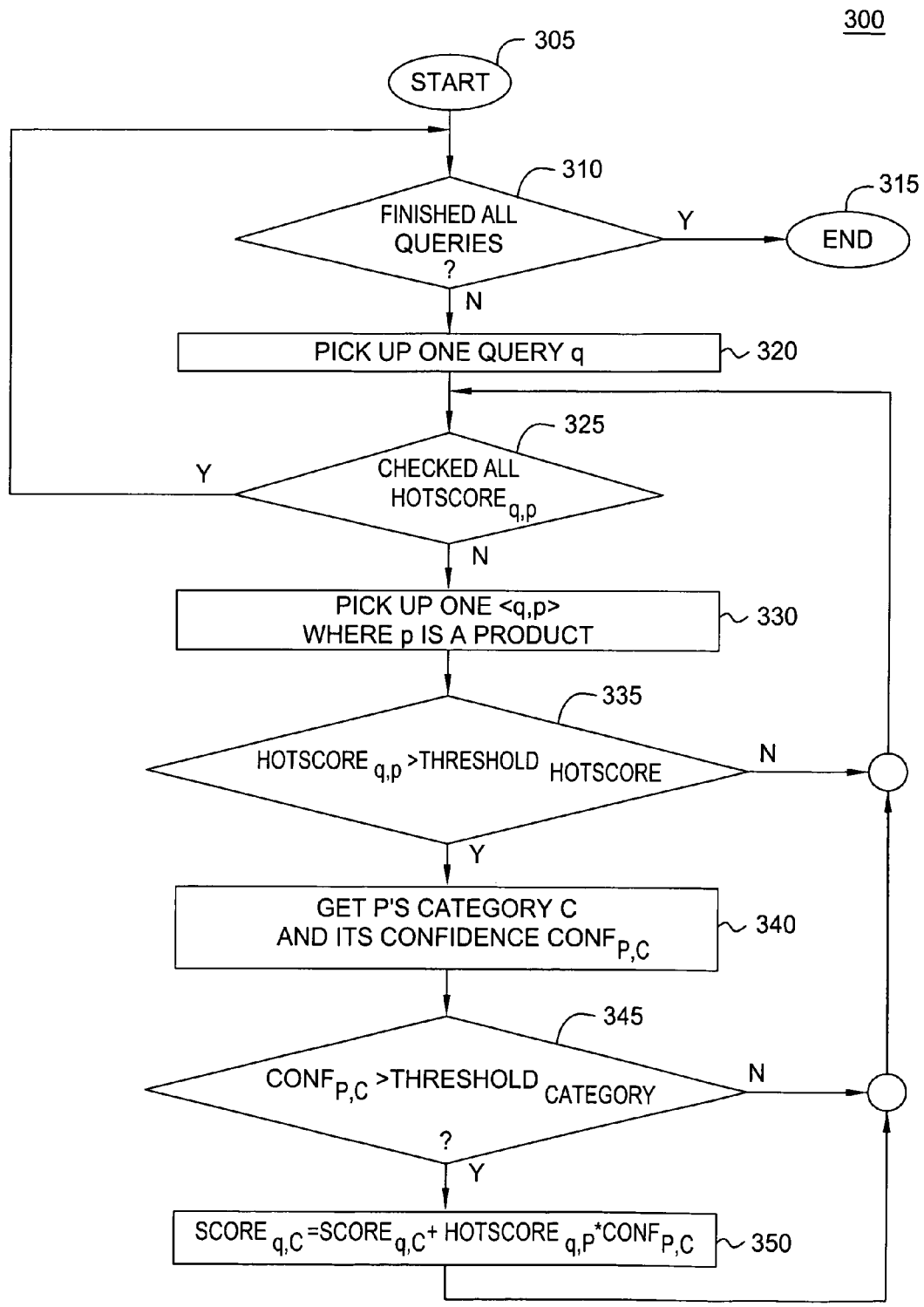
FIG. 3 illustrates a method of calculating a score for a query-category pair.

FIG. 3 illustrates a method 300 of calculating a score for a query-category pair. For example, method 300 is implemented in step 210 of FIG. 2. Method 300 starts in step 305 and proceeds to step 310.

In step 310, method 300 queries whether all queries have been processed, i.e., whether scores for all query-category pairs have been calculated. If the query is positively answered, then method 300 ends in step 315. If the query is negatively answered, then method 300 proceeds to step 320.

In step 320, method 300 selects one on the queries and proceeds to step 325. For example, the query (q) "apple" is selected from a plurality of queries.

In step 325, method 300 queries whether all scores, e.g., $Hotscore_{q,p}$ for the query q have been checked. If the query is positively answered, then method 300 returns to 310, where another query, if available, is selected. If the query is negatively answered, then method 300 proceeds to step 330.

In step 330, a query-product pair <q, p> is selected, where p represents a particular product. For example, an exemplary query-product pair <q, p> can be <apple, G3 desktop computer>, where apple is the search term or query q and the product p is a G3 desktop computer.

In step 335, method 300 queries whether the score, e.g., $Hotscore_{q,p}$ is greater than a threshold. If the score is less than a predefined threshold, then the score for that particular query-product pair is not considered and method 300 returns to step 325 to check for the next query-product pair. If the score is greater than a predefined threshold, then the score for that particular query-product pair is considered in step 340. For example, if the threshold is set at 600 and the query-product pair <apple, Christmas tree ornament> has a score of 20, then it is not considered. However, if the query-product pair <apple, G3 desktop computer> has a score of 750, then it is considered.

In step 340, method 300 obtains product p's category C and its confidence level $Conf_{P,C}$. The confidence level $Conf_{P,C}$ represents the confidence level of a product being associated with a particular category. For example, the $Conf_{P,C}$ for the product, "laptop" being associated with the category "computer" should be fairly high. Whereas, the $Conf_{P,C}$ for the product, "train" being associated with the category "Christmas ornament" may be low.

In step 345, method 300 queries whether the confidence level $Conf_{P,C}$ is greater than a predefined threshold. If the query is negatively answered, then method 300 ignores the score for query-product pair. If the query is positively answered, then method 300 considers the score for query-product pair in step 350.

In step 350, method 300 applies the query-product score in accordance with the confidence level $Conf_{P,C}$ to calculate the score for the query-category pair. For example, in one embodiment, the query-product score is calculated in accordance with $score_{q,c} = Score_{q,c} + Hotscore_{q,p} \times Conf_{P,C}$. Method 300 then returns to step 325.

To illustrate, if the query-category pair is <apple, electronics> and the set of query-product pairs are as follows:

<apple, laptop computer>, with Hotscore of 700 and $Conf_{P,C}$ of 75%;
<apple, G3 desktop computer>, with Hotscore of 700 and $Conf_{P,C}$ of 75%;
<apple, Christmas ornament>, with Hotscore of 20 and $Conf_{P,C}$ of 10%;

then the calculated score for query-category pair is <apple, electronics> may be:

(700×0.75)+(700×0.75)=1050.

It should be noted that the above example is only illustrative.

Figure 4:
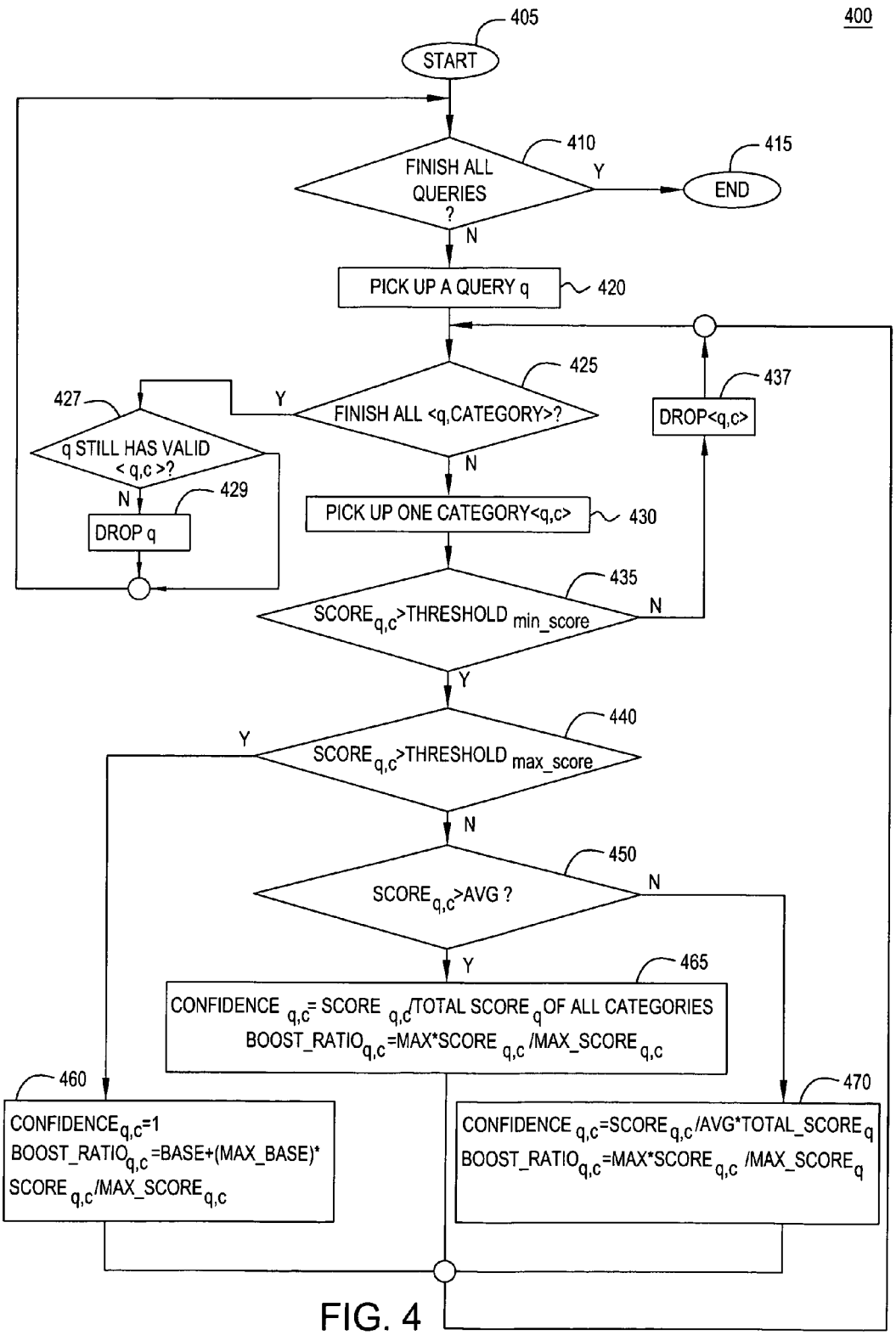
FIG. 4 illustrates a method for performing a trimming or normalization function on the query-category pair scores.

FIG. 4 illustrates a method 400 for performing a trimming or normalization function on the query-category pair scores. For example, method 400 can be implemented in step 230 of FIG. 2. Method 400 starts in step 405 and proceeds to step 410.

In step 410, method 400 queries whether all queries have been processed. If the query is positively answered, then method 400 ends in step 415. If the query is negatively answered, then method 400 proceeds to step 420.

In step 420, method 400 selects one on the queries q and proceeds to step 425. For example, the query (q) "apple" is selected from a plurality of queries.

In step 425, method 400 queries whether all query-category pairs have been processed for q. In this example, for the query "apple", various possible "query-category" (e.g., <q, c>) pair may comprise <apple, apparel>, <apple, pastry>, <apple, electronics>, <apple, computer>, and so on. If the query is positively answered, then method 400 proceeds to step 427. If the query is negatively answered, then method 400 proceeds to step 430.

In step 427, method 400 queries whether query q still has valid query-category pairs. If the query is positively answered, then method 400 returns to step 410. If the query is negatively answered, then method 400 drops the query q in step 429 and returns to step 410.

In step 430, method 400 selects a category for the q. For example, the query-category pair <apple, apparel> is selected.

In step 435, method 400 queries whether a score for the selected query-category pair is greater than a $threshold_{min\_score}$, e.g., 10. If the query is negatively answered, then method 400 proceeds to step 437, where the query-category pair is dropped. For example, the query-category pair <apple, apparel> may have a very low score, because based upon sales and click information, few users are entering the search term "apple" to search for apparel. If the query is positively answered, then method 400 proceeds to step 440.

In step 440, method 400 queries whether a score for the query-category pair is greater than a $threshold_{max\_score}$, e.g., 500. If the query is negatively answered, then method 400 proceeds to step 450. If the query is positively answered, then method 400 proceeds to step 460. For example, if the query-category pair <apple, electronics> is selected, then its score may be very high. In fact, this high score may actually exceed a maximum threshold. Such high score will be treated differently as discussed below.

In step 450, method 400 queries whether a score for the query-category pair is greater than an average score. In one embodiment, the average score is defined as the average score for all query-category pair scores for a particular query. For example, the average score for the query "apple" can be the average score of all the scores for the category pairs: <apple, apparel>, <apple, pastry>, <apple, electronics>, and <apple, computer>. If the query is negatively answered, then method 400 proceeds to step 470. If the query is positively answered, then method 400 proceeds to step 465.

In steps 460, 465, and 470, method 400 employs three different methods to generate a confidence$_{q,c}$ and a boost_ratio$_{q,c}$ as shown in FIG. 4.

For example, in step 460, a first formulation computes confidence$_{q,c}$ and boost_ratio$_{q,c}$ as:

Confidence$_{q,c}$=1

Boost_ratio$_{q,c}$=Base+(Max−Base)×score$_{q,c}$/Max_score$_{q,c}$.

The base is defined as a minimum boost ratio, e.g., 500, and Max is defined as a maximum boost ratio, e.g., 1000. It should be noted these values are arbitrarily set and can be adjusted in accordance with a particular application. The score$_{q,c}$ is the score for the current query category pair, whereas the Max_score$_{q,c}$ is the query category pair within the query set that has the highest score. For example, the current query category pair may be <apple, IPOD> with a score of 900, and the Max_score$_{q,c}$ for the query set of "apple" may be for the query category pair <apple, electronics> with a score of 2000.

For example, in step 465, a second formulation computes confidence$_{q,c}$ and boost_ratio$_{q,c}$ as:

Confidence$_{q,c}$=score$_{q,c}$/total score$_{q,c}$ of all categories

Boost_ratio$_{q,c}$=Max×score$_{q,c}$/Max_score$_{q,c}$

Max is again defined as a maximum boost ratio, e.g., 1000. It should be noted this value is arbitrarily set and can be adjusted in accordance with a particular application. The score$_{q,c}$ is the score for the current query category pair, whereas the Max_score$_{q,c}$ is the query category pair within the query set that has the highest score. The total score$_{q,c}$ of all categories is the total score for all the categories associated with a query. For example, the total score for the query "apple" can be the total score of all the scores for the category pairs: <apple, apparel>, <apple, pastry>, <apple, electronics>, and <apple, computer>.

For example, in step 470, a third formulation computes confidence$_{q,c}$ and boost_ratio$_{q,c}$ as:

Confidence$_{q,c}$=score$_{q,c}$/AVG×total score$_{q,c}$

Boost_ratio$_{q,c}$=Max×score$_{q,c}$/Max_score$_{q,c}$.

Max is again defined as a maximum boost ratio, e.g., 1000. It should be noted this value is arbitrarily set and can be adjusted in accordance with a particular application. The score$_{q,c}$ is the score for the current query category pair, whereas the Max_score$_{q,c}$ is the query category pair within the query set that has the highest score. The total score$_{q,c}$ of all categories is the total score for all the categories associated with a query. For example, the total score for the query "apple" can be the total score of all the scores for the category pairs: <apple, apparel>, <apple, pastry>, <apple, electronics>, and <apple, computer>. The average score, AVG, is defined as the average score for all query-category pair scores for a particular query. For example, the average score for the query "apple" can be the average score of all the scores for the category pairs: <apple, apparel>, <apple, pastry>, <apple, electronics>, and <apple, computer>.

It should be noted that the present invention is not limited by the formulations as disclosed above. Namely, other formulations can be employed to generate the confidence$_{q,c}$ and the boost_ratio$_{q,c}$ values.

Figure 5:
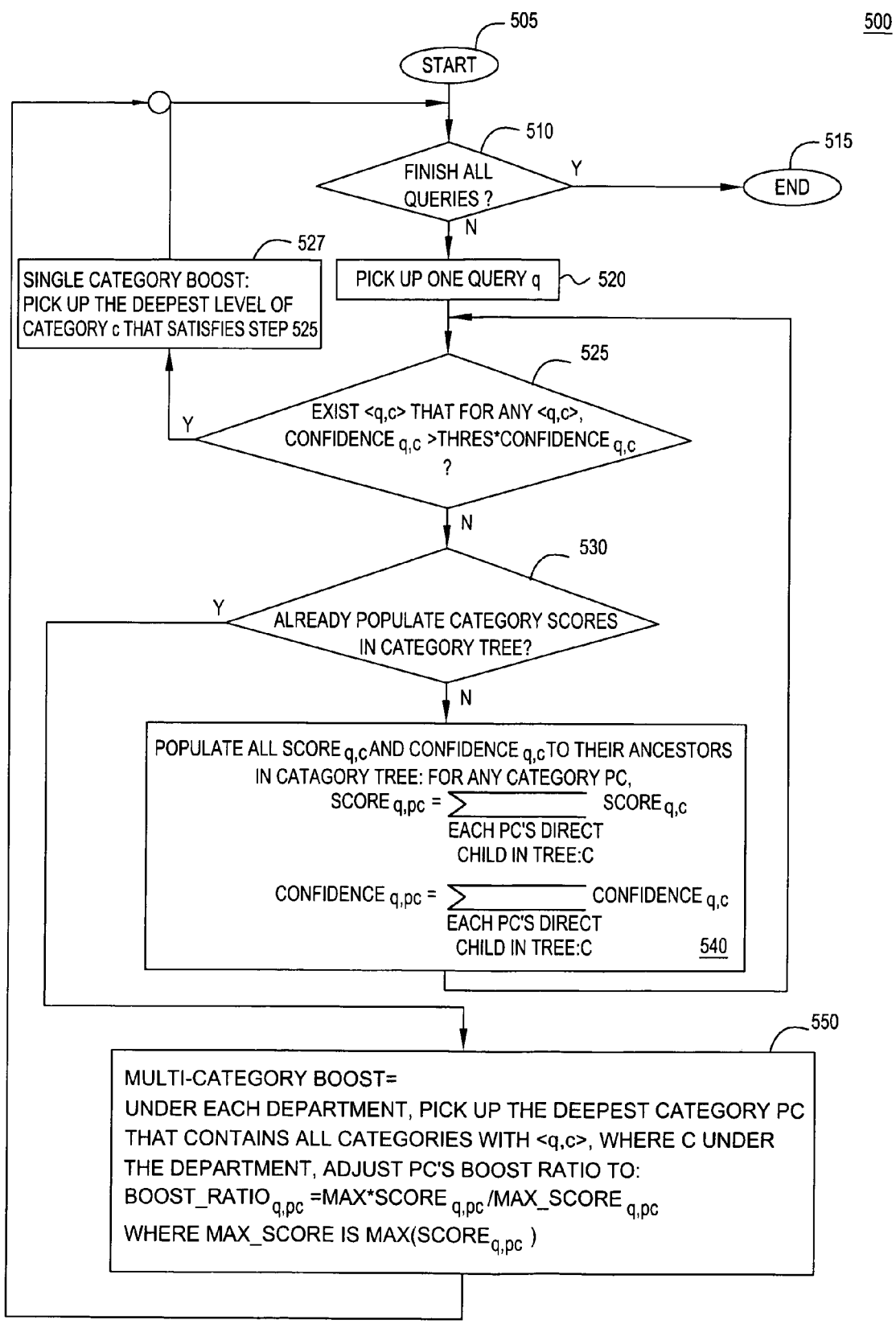
FIG. 5 illustrates a method for collapsing a category tree.

FIG. 5 illustrates a method 500 for collapsing a category tree. For example, method 500 can be implemented in step 240 of FIG. 2. Collapsing a category tree attempts to address the issue where certain categories may have very low scores and/or low confidences. To avoid the problem of inadvertently boosting a low confidence category, it is more advantageous to collapse a category tree. For example, if a user uses the query term "apple" to search for items such as tools for baking apples, then the query category pair <apple, tool> may have a relatively low score. To avoid maintaining this category, one may optionally collapse this low confident category into a higher category, e.g., <apple, kitchen> and so on. As another example, both <apple, desktops> and <apple, laptops> may not have high confidence, while after collapsing, the next node <apple, computers> will have a high confidence, and is a more complete boost. Thus, collapsing the category tree assists in reducing the number of query-category pairs, avoids inadvertent boosting of a search term into a low confidence category, and helps boost more completely.

Method 500 starts in step 505 and proceeds to step 510. In step 510, method 500 queries whether all queries have been processed. If the query is positively answered, then method 500 ends in step 515. If the query is negatively answered, then method 500 proceeds to step 520.

In step 520, method 500 selects one on the queries q and proceeds to step 525. For example, the query (q) "apple" is selected from a plurality of queries.

In step 525, method 500 queries whether there is a dominate query-category pair. Namely, method 500 queries if there exists a single dominate query-category pair, where the confidence of this dominant query category is greater than a threshold (THRES), e.g., 1.5, multiplied with a confidence of any of the query-category pairs associated with the query. For example, if the query is "apple" and there are three query-category pairs of <apple, apparel> with confidence of 0.2, <apple, tool> with confidence of 0.1, and <apple, electronics> with confidence of 0.9, then there is a dominant query category of <apple, electronics>. This is due to the fact that 0.9> then both (1.5×0.2) and (1.5×0.1). If the query is positively answered, then method 500 proceeds to step 527. If the query is negatively answered, then method 500 proceeds to step 530.

In step 527, all other query categories are collapsed into the dominant category. Using the example above, the <apple, apparel> pair and the <apple, tool> pair are deleted and only the <apple, electronics> pair is retained.

In step 530, method 500 queries whether category scores have already been populated in the category tree. Namely, method 500 is querying whether a score and/or confidence of a child category have been populated (carried upward) to a parent category for the entire category tree. For example, the query category pair <apple, MP3 player> can be a child of query category pair <apple, personal electronic player>, which, in turn, can be a child of query category pair <apple, electronics> and so on. If the query is positively answered, then method 500 proceeds to step 550. If the query is negatively answered, then method 500 proceeds to step 540.

In step 540, method 500 populates the category tree. In one embodiment, the method populates all scores and confidences to the ancestors in the category tree for any category pc (product category) in accordance with:

$$Score_{q,pc} \sum_{each\ pc's\ direct\ child\ in\ tree:\ c} Score_{q,c}$$

$$Confidence_{q,pc} \sum_{each\ pc's\ direct\ child\ in\ tree:\ c} Confidence_{q,c}.$$

In step 550, method 500 applies multi-category boost, e.g., applied to each department of the category tree. In one embodiment, the "department" can be defined as the first nodes of the category tree, e.g., "apple electronics", "apple computers" and so on. In another embodiment, the department can be defined as a higher node in the category tree that has a relatively large confidence value. The approach is that there may be various departments within the category tree that may have similar confidence values. It would be advantageous to determine what sub-category within each department that may be dominant and is the direct cause of the relatively high confidence for the pertinent department. Boosting the pertinent sub-category for each department constitutes the present multi-category boost.

In step 550, method 500 attempts to find the "deepest" category that contains all categories with <q, c>, where c is under the department. In other words, find the dominant sub-category within each department, e.g., where the sub-category has the highest confidence value. For example, one department node can be <apple, electronics>, with a child node <apple, personal electronic player>, with a grandchild node <apple, MP3 player>, with two great grandchildren nodes <apple, MP3 player with large memory> and <apple, MP3 with small player>. Method 500 may determine that the high confidence value for the department <apple, electronics> is directly attributable to the grandchild node <apple, MP3 player>. If that is the case, method 500 applies the following boost:

$$\text{boost\_ratio}_{q,pc} = \text{MAX} \times \text{score}_{q,pc} / \text{Max\_score}_{q,pc}.$$

The term MAX is a constant, e.g., 1000. The $\text{score}_{q,pc}$ is the score of the sub-node to be boosted, and $\text{Max\_score}_{q,pc}$ is the maximum score of any category within the category tree. Thus, in the example above, the sub-category <apple, MP3 player> will receive a boost in step 550. Method 500 then returns to step 510.

Figure 6:
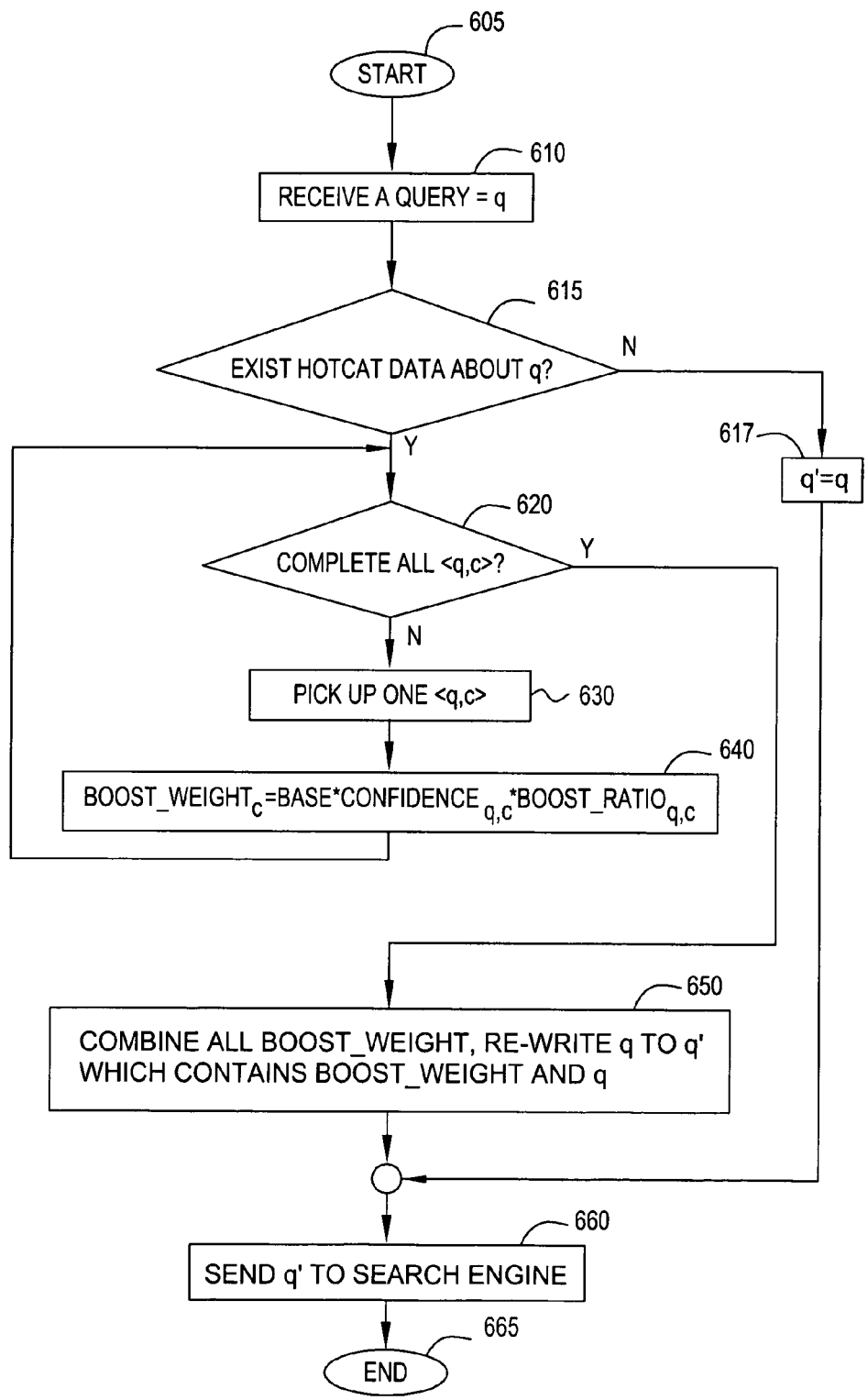
FIG. 6 illustrates a method for using the score, e.g., HotCat score to improve search relevancy.

FIG. 6 illustrates a method 600 for using the score, e.g., HotCat score approach as discussed above, to improve search relevancy. Method 600 starts in step 605 and proceeds to step 610.

In step 610, method 600 receives a query, e.g., apple. Namely, a user has entered the search term "apple".

In step 620, method 600 determines if there exists "hotcat" data associated with the search term. In other words, method 600 determines if category data exists for the search term "apple". If the query is negatively answered, method 600 proceeds to step 617. If the query is positively answered, then method 600 proceeds to step 620.

In step 617, the method simply assigns q and q' and passes the search term to step 660, where the search term q' is sent to a search engine. Since there is no category data for the search term, no assistance can be provided to the search engine.

In step 620, method 600 queries if all categories associated with the query has been checked and/or computed. In other words, if the query is apple, there may be data associated with the query category pairs of <apple, electronics>, <apple.MP3 player>, <apple, personal electronic player> and so on. If the query is negatively answered, method 600 proceeds to step 630. If the query is positively answered, method 600 proceeds to step 650.

In step 630, one of the query-category pair is selected.

In step 640, a boost_weight for each category is computed. It should be noted that if the boost_weight for each category has already been computed, then step 640 can be deemed as a look-up step. In one embodiment, the boost_weight is computed as:

$$\text{boost\_weight}_c = \text{Base} \times \text{Confidence}_{q,c} \times \text{boost\_ratio}_{q,c}.$$

The Base is a constant, e.g., 500. The $\text{Confidence}_{q,c}$ is the confidence value of the query-category pair and $\text{boost\_ratio}_{q,c}$ is the boost ratio of the query-category pair.

In step 650, method 600 combines all the boost_weights and rewrites the query q to q'. In other words, method 600 is adding category information to the search term to assist the search engine. For example, the search term "apple" (q) can be rewritten as "apple" with three boost_weights of: 1000 for the query-category pair <apple, MP3 player>, 100 for the query-category pair <apple, apparel>, and 700 query-category pair <apple, laptop>, and so on. This modified query is then sent to a search engine in step 660 and method 600 ends in step 665.

It should be noted that various examples and values are provided above in disclosing the present invention. It should be noted that these examples and values are provided to assist the reader in the understanding of the present information and, therefore, should not be interpreted as a limitation of the present invention.

It should be noted that the above disclosure describes the present invention within the context of shopping. However, those skilled in the art will realize that the present invention is not so limited. Namely, in one embodiment, the present invention can be implemented for searching in general, e.g., generating the relevancy scores and related search terms in accordance with the click information.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method performed on a processor for generating search results for a user based on category information and click information, wherein said click information is from a plurality of users, comprising:

receiving a search query;

determining category information indicative of at least one category of potential search results, wherein said at least one category is associated with said search query based in part on said click information;

determining at least one relevancy score indicative of a relevancy of said search query to said category information, wherein said at least one relevancy score is based in part on said click information;

determining at least one confidence value for said search query, wherein said at least one confidence value indicates a level of certainty of the search query being associated with a category indicated in said category information, and said at least one confidence value is a function of at least a potential search result, said category information and said click information;

determining at least one boost weight for said category information based at least in part on said at least one confidence value and said at least one relevancy score, wherein said at least one boost weight indicates increased relevance of at least one category included in said category information and is independent of said user; and providing said category information and said at least one boost weight to said search query to generate a modified search query to generate search results for said user.

2. The method of claim 1, wherein said at least one relevancy score is derived in accordance with sales information.

3. The method of claim 1, wherein said click information comprises tracking data from said plurality of users indicative of choices made by said plurality of users for each search term.

4. The method of claim 1, wherein said category information is normalized.

5. The method of claim 4, wherein said category information is normalized to remove a query-category pair that is below a minimum threshold.

6. The method of claim 4, wherein said category information is normalized to boost a confidence value and a boost ratio for a query-category pair that is above a minimum threshold.

7. The method of claim 1, wherein said category information comprises a plurality of categories organized into a category tree.

8. The method of claim 7, wherein one or more of said plurality of categories is collapsed in accordance with a dominant sub-category.

9. The method of claim 7, further comprising: applying a multi-category boost to at least two categories of said category tree.

10. The method of claim 1, further comprising:
    forwarding said search query and said category information to a search engine.

11. The method of claim 1, wherein said category information relates to a product category.

12. A computer-readable medium having stored thereon a plurality of instructions, the plurality of instructions including instructions which, when executed by a processor, cause the processor to perform a method for generating search results for a user based on category information and click information, wherein said click information is from a plurality of users, comprising:
    receiving a search query;
    determining category information indicative of at least one category of potential search results, wherein said at least one category is associated with said search query based in part on said click information;
    determining at least one relevancy score indicative of a relevancy of said search query to said category information, wherein said at least one relevancy score is based in art on said click information;
    determining at least one confidence value for said search query, wherein said at least one confidence value indicates a level of certainty of the search query being associated with a category indicated in said category information, and said at least one confidence value is a function of at least a potential search result, said category information and said click information;
    determining at least one boost weight for said category information based at least in part on said at least one confidence value and said at least one relevancy score, wherein said at least one boost weight indicates increased relevance of at least one category included in said category information and is independent of said user; and
    providing said category information and said at least one boost weight to said search query to generate a modified search query to generate search results for said user.

13. The computer-readable medium of claim 12, wherein said at least one relevancy score is derived in accordance with sales information.

14. The computer-readable medium of claim 12, wherein said click information comprises tracking data from said plurality of users indicative of choices made by said plurality of users for each search term.

15. The computer-readable medium of claim 12, wherein said category information is normalized.

16. The computer-readable medium of claim 15, wherein said category information is normalized to remove a query-category pair that is below a minimum threshold.

17. The computer-readable medium of claim 15, wherein said category information is normalized to boost a confidence value and a boost ratio for a query-category pair that is above a minimum threshold.

18. The computer-readable medium of claim 12, wherein said category information comprises a plurality of categories organized into a category tree.

19. The computer-readable medium of claim 18, wherein one or more of said plurality of categories is collapsed in accordance with a dominant sub-category.

20. The computer-readable medium of claim 18, further comprising:
    applying a multi-category boost to at least two categories of said category tree.

21. An apparatus for generating search results for a user based on category information and click information, wherein said click information is from a plurality of users, comprising:
    means for receiving a search query;
    means for determining category information indicative of at least one category of potential search results, wherein said at least one category is associated with said search query based in part on said click information;
    means for determining at least one relevancy score indicative of a relevancy of said search query to said category information, wherein said at least one relevancy score is based in part on said click information;
    means for determining at least one confidence value for said search query, wherein said at least one confidence value indicates a level of certainty of the search query being associated with a category indicated in said category information, and said at least one confidence value is a function of at least a potential search result, said category information and said click information;
    means for determining at least one boost weight for said category information based at least in part on said at least one confidence value and said at least one relevancy score, wherein said at least one boost weight indicates increased relevance of at least one category included in said category information and is independent of said user; and
    means for providing said category information and said at least one boost weight to said search query to generate a modified search query to generate search results for said user.

* * * * *